(Model.)

D. A. WOODBURY.
Lubricators for Slides for Steam Engines and other Machinery.

No. 230,099.          Patented July 13, 1880.

ATTEST.          INVENTOR.

UNITED STATES PATENT OFFICE.

DANIEL A. WOODBURY, OF ROCHESTER, NEW YORK.

LUBRICATOR FOR SLIDES FOR STEAM-ENGINES AND OTHER MACHINERY.

SPECIFICATION forming part of Letters Patent No. 230,099, dated July 13, 1880.

Application filed April 5, 1880. (Model.)

*To all whom it may concern:*

Be it known that I, DANIEL A. WOODBURY, of the city of Rochester, county of Monroe, State of New York, have invented a new and useful Improvement in Lubricators for the Slides of Steam-Engines, which improvement is fully set forth in the following specification and accompanying drawings, in which—

Figure 1:
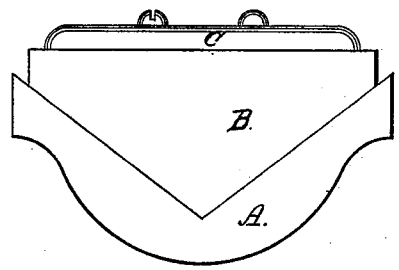
Figure 2:
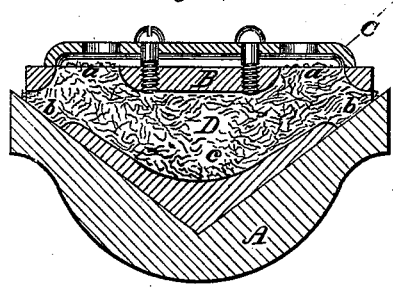
Figure 3:
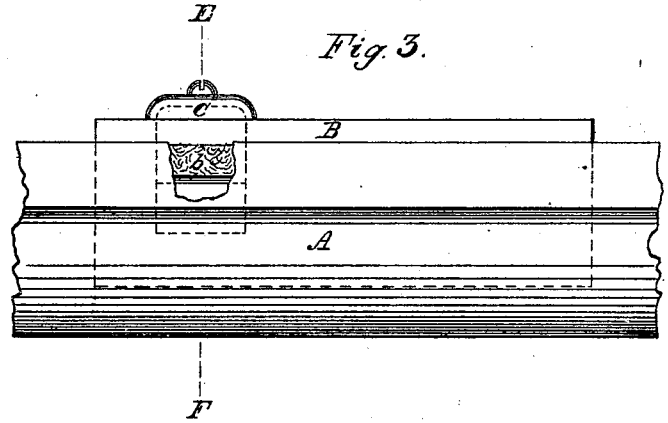

Figure 1 is an end view; Fig. 2, a cross-section on the line E F, Fig. 3; Fig. 3, a side view with a portion of the guide broken out to show the opening $b$.

The object of my invention is to furnish a device by which a supply of oil is carried in the slide and applied to the upper edges of the guide, as required, from thence working gradually downward, keeping the entire surface constantly lubricated by the use of a small quantity of oil.

In the drawings, A is the guide; B, slide-block attached to and moving with the cross-head of the engine, and provided with the chamber D with the openings $a\ a$ and $b\ b$, and so constructed as to form a basin or reservoir at $c$, Fig. 2. This chamber is filled with cotton-waste or other suitable material.

The oil is supplied through the openings $a\ a$, saturating the stuffing and filling the reservoir $c$, from whence it is drawn by capillary attraction as it is given out at $b\ b$.

C is a cover partially closing the openings $a\ a$, and is removed in renewing the stuffing in the chamber D.

The operation of my device will be readily understood from the description given.

This invention is also applicable to other reciprocating machines having similarly formed slides.

What I claim as new, and desire to secure by Letters Patent, is—

The combination of the guide A with slide-block B, containing the chamber D, with its openings $a\ a$ and $b\ b$, all constructed and operating substantially as described.

D. A. WOODBURY.

Witnesses:
ALVAH STRONG,
HENRY A. STRONG.